US00RE39567E

(19) United States
(12) Reissued Patent
Larsen

(10) Patent Number: US RE39,567 E
(45) Date of Reissued Patent: Apr. 17, 2007

(54) NAIL GUIDE MECHANISM FOR A NAIL GUN

(75) Inventor: Mark E. Larsen, Spanish Fork, UT (US)

(73) Assignee: Stanley Fastening Systems, L.P., East Greenwich, RI (US)

(21) Appl. No.: 10/968,818

(22) Filed: Oct. 20, 2004

Related U.S. Patent Documents

Reissue of:
(64) Patent No.: 6,279,808
Issued: Aug. 28, 2001
Appl. No.: 09/360,723
Filed: Jul. 27, 1999

(51) Int. Cl.
*B25C 7/00* (2006.01)

(52) U.S. Cl. ..... 227/119; 227/123
(58) Field of Classification Search ..... 227/119, 227/139, 149, 147, 123
See application file for complete search history.

(56) References Cited

U.S. PATENT DOCUMENTS

| | | | | | |
|---|---|---|---|---|---|
| 1,726,012 | A | * | 8/1929 | Bilz | 227/147 |
| 2,853,707 | A | * | 9/1958 | Juilfs | 227/123 |
| 2,994,880 | A | * | 8/1961 | Willis | 173/203 |
| 4,003,417 | A | * | 1/1977 | Cornwell | 81/57.37 |
| 4,195,762 | A | * | 4/1980 | Burton | 227/156 |
| 4,252,260 | A | * | 2/1981 | Burton | 227/119 |
| 4,454,650 | A | * | 6/1984 | Silver | 29/818 |
| 5,052,607 | A | * | 10/1991 | Dutton | 227/107 |
| 5,238,167 | A | * | 8/1993 | Howard et al. | 227/110 |
| 5,452,835 | A | * | 9/1995 | Shkolnikov | 227/8 |
| 5,810,239 | A | * | 9/1998 | Stich | 227/119 |
| 5,873,509 | A | * | 2/1999 | Liao | 227/109 |
| 6,789,718 | B2 | | 9/2004 | Canlas et al. | |

OTHER PUBLICATIONS

Product Sheet, Paslode Model 5250/65S–PP Positive Placement Strip Nailer, Tool Schematic and Parts, Nov. 1998 (6 pages).*

* cited by examiner

*Primary Examiner*—Scott A. Smith
(74) *Attorney, Agent, or Firm*—Pillsbury Winthrop Shaw Pittman, LLP

(57) ABSTRACT

A nail guide mechanism, suitable for use with a wide variety of nail guns, having a mounting bracket to permit ready attachment and/or removal in the field. The guide mechanism, when mounted, is oriented about the channel defined by the nose of the nail gun. The guide mechanism includes a partially pre-compressed spring that induces a bias on a pivoting arm such that the arm is caused to protrude at least partially into the channel. The arm is thus positioned to continuously exert a force on the nails as they are driven down the channel past the arm. Because the spring is only partially pre-compressed, the positioning of the arm is responsive to changes in conditions inside the channel, such as when the head of a nail passes by the arm. The force exerted by the arm, under the influence of the spring, acts substantially along the radial axis of the nail, and is exerted on the nail during at least a portion of the time that the nail is being impelled by the driving mechanism of the nail gun. The result of the force thus exerted is that every nail is pushed to a desired position in the channel, thereby ensuring consistent orientation of the nails as they exit the nail gun. The guide mechanism also includes a pilot which, when the mechanism is mounted, is located immediately adjacent to the channel. The pilot has a small tip that is inserted into the nail hole so as to provide assurance that the nail gun is properly located. The pilot therby cooperates with the arm to ensure accurate and consistent placement and orientation of each nail as it exits the gun.

24 Claims, 6 Drawing Sheets

NAIL GUIDE MECHANISM FOR A NAIL GUN

Matter enclosed in heavy brackets [ ] appears in the original patent but forms no part of this reissue specification; matter printed in italics indicates the additions made by reissue.

BACKGROUND OF THE INVENTION

1. The Field of the Invention

The present invention relates generally to powered fastener drivers and particularly relates to an improved nail gun having a guide mechanism to facilitate accurate and consistent orientation and placement of nails as the nails exit the nail gun.

2. The Relevant Technology

In the endless pursuit of increased productivity, industry has continuously sought ways to improve worker effectiveness and efficiency. Many traditionally manual functions are now partly or fully accomplished by mechanized means. One of the major advances in the construction industry was the development of powered nail guns. These guns typically drive nails or other fastnerers by means of a driving mechanism which, in turn, is impelled by compressed air, electrical power, or the like. Powered nail guns have numerous advantages, not the least of which is the ability to drive nails or other fasteners in a fraction of the time that would be required for a construction worker using a traditonal hammer. Another important advantage of these guns is their ability to drive a variety of fastener types into a wide range of materials, such as concrete, steel, sheet metal, and wood.

While powered nail guns clearly provide significant advantages in terms of efficiency and versatility, the nail guns are not without their shortcomings. A major problem area concerns the inaccuracy and inconsistency of nail placement and orientation.

In order for nail guns to realize their maximum potential as effective and useful tools, they must be both accurate and consistent in their placement and orientation of nails. Nail guns that shoot nails inaccurately and/or inconsistently are a source of frustration at best, resulting in re-working wasted production time. At worst, inaccurate and/or inconsistent nail guns can cause serious injury to the operator or to others near the work area; the high magnitude of the driving forces utilized by typical nail guns makes the problems of inaccuracy and inconsistency particularly dangerous.

The problems of inaccuracy and inconsistensy in the placement and orientation of nails can manifest themselves in all types of nail guns and with all types of fasteners. However, these problems become especially acute when the nail gun is shooting relatively shorter nails, such as the nails typically used to secure metal joist hangers, ties, and straps; generally, these types of nails are approximately 1¼" to 2½" in length.

A major cause of inaccuracy/inconsistency problems relates to the channel defined by the nose of the nail gun. The nose of the gun defines a generally U-shaped channel, inside the nail gun, through which the nails travel, typically, this channel is somewhat larger in diameter than the driven fasteners. As a result of the dimensional differences between the nails and the channel through which they travel, the nails have some freedom to move about inside the channel and thus are prone to tilt back and forth slightly or "tumble" as they are pushed down the channel. Generally, relatively shorter nails are more susceptible to tumbling than are relatively longer nails. Because the typical nail gun has no means to prevent the fasteners from tumbling, the nails tend to exit the nail gun in random orientations. Thus, the nail gun operator can never be completely assured that a particular nail will come out straight, or that the nail will enter the work piece at the point that the operator intended.

As noted earlier, inaccurate and inconsistent nail placement and orientation is, at best, problematic. However, when the operator is using the nail gun to drive nails through holes pre-drilled in metal items such as joist hangers and straps, inaccuracy and inconsistency present serious safety hazards. Specifically, the random placement and orientation of the nails that is typical of many nail guns, coupled with the high energy of typical nail gun drive mechanisms, causes some nails to miss the pre-drilled hole entirely, strike the metal, and ricochet dangerously away.

The dangers presented by inaccurate and inconsistent nail placement and orientation have not gone unrecognized in the field. Efforts have been made to resolve, or at least minimize, the possible effects of inaccurate and inconsistent nail driving when attaching metal members. However, as indicated in the following discussion, these prior efforts fail to completely and effectively resolve the problems.

At least one attempt to resolve the problem of inaccurate and inconsistent nail orientation and placement has placed the primary focus not on the nail gun itself, but rather on the material through which the nail is being driven. In particular, the material, typically sheet metal of some kind, is embossed in such a way that the embossment forms a funnel-shaped indentation centered about each of the holes pre-drilled in the sheet metal. The purpose of the funnel is to guide errant nails towards the hole as the nails exit the nail gun.

The embossed funnel approach is somewhat problematic however. First, it fails to correct the fundamental cause of the inaccuracy and inconsistency problems; that is, the tendency of the nails to tumble as they are being driven. Rather than preventing the tumbling problem, the funnel approach is focused at correcting the effects of tumbling after the tumbling has already occurred. More importantly however, this approach is disadvantageous because of the increased tooling and production costs involved with embossing the metal through which the nail is fastened. Finally, embossed metal fittings are essential to the success of this method; clearly, if the user does not have access to embossed metal fittings or if the fittings are unavailable for any reason, the problems of inaccurate and inconsistent nail placement will persist.

Another of the other attempts at resolving the inaccuracy and inconsistency problems in nail placement and orientation focuses on the nail gun itself. In this case, a specialized nail gun has been developed which allows the tip of the nail to be extended partially from the gun prior to driving. In this way, the user can place the tip of the nail in the hole, and then pull the trigger of the gun to drive the nail. This has proven to be a limited solution however.

The major shortcoming of this approach is that because the "protruding tip" nail gun is specially adapted for the particular purpose of driving nails in metal items, it is not suitable for other applications, such as framing. Thus, a contractor would be required to incur the additional, and substantial, expense of purchasing an extra nail gun for the sole purpose of attaching metal members such as joist hangers.

In view of the aforementioned problems with driving nails in metal members, what is needed is an improved nail gun that will provide both consistent and accurate nail placement and orientation, without requireing special modification of the work piece. Specifically, the nail gun should have a guide mechanism that would prevent the nails from tumbling as they are driven from the nail gun. Further, the guide mechanism should be readily adaptable and field mountable to a variety of conventional nail guns, so as to preclude the need for purchase of a specialized gun. Finally, the guide mechanism should have a pilot or the like to provide the operator with assurance that the gun is properly lined up with respect to the hole in the work piece.

BRIEF SUMMARY AND OBJECTS OF THE INVENTION

The present invention has been developed in response to the current state of the art, and in particular in response to the aforementioned and other problems and needs that have not been fully or completely solved by currently available nail guns. Thus, it is an overall object of the present invention to provide a nail gun guide mechanism that is well adapted to prevent tumbling of the nails as they are driven, thereby ensuring consistent and accurate placement and orientation of the nails as they are driven into and/or through the work piece. It is a related object of one embodiment of the present invention to provide a nail gun guide mechanism having a pilot to enable the user to quickly and easily determine when the nail gun is desirably situated over the hole in the work piece. It is also an object of one embodiment of the present invention to provide a nail gun guide mechanism that does not require special preparation of the work piece through which the nail is to be driven. It is a further object of one embodiment of the invention to provide a nail gun guide mechanism adapted to be readily attached and removed, in the field, to a variety of different nail guns so as to preclude the need for purchase of an additional, specialized, nail gun.

In summary, the foregoing and other objects, advantages and features are achieved with an improved nail gun guide mechanism for use in facilitating accurate and consistent placement and orientation of nails. Embodiments of the present invention are particularly suitable for use in connection with conventional nail guns capable of driving the relatively short nails typically used to mount metal members such as joist hangers and the like. The nail guide mechanism is attached to the nose of the nail gun so that the guide mechanism is well-positioned to orient and guide the nail as the nail is driven through and/or into the work piece.

In one preferred embodiment, the nail gun guide mechanism is of two piece construction, comprising a mounting bracket and a guide portion. In an alternative preferred embodiment, the guide portion is integral with the mounting bracket. Preferably, the nail gun guide mechanism is secured to the nail gun by means of screws, bolts or the like, so as to facilitate ready removal and/or installation in the field. The guide mechanism includes a biased arm that is mounted to the guide mechanism such that the arm, acting under the influence of the bias, protrudes into the channel of the nail gun thereby exerting a force on each nail as the nails travel down the channel and pass by the arm. Preferably, the force thus exerted acts substantially along the radial axis of the nail so as to push each nail to the bottom of the nail gun channel, thereby ensuring accurate and consistent orientation and placement of each nail. In one preferred embodiment, the force acts on the nail during at least a portion of the time that the nail is being impelled by the driving mechanism.

Preferably, the biased arm pivots about a pin that is secured to the body of the guide mechanism. The bias is imposed on the arm by means of a partially pre-compressed spring, one end of which is attached to the structrue of the guide mechanism and the other end being attached to the upper portion of the arm. Because the spring is only partially pre-compressed, it permits the arm to move in response to changing conditions inside the channel, such as when the nail head passes by the arm.

Finally, one preferred embodiment of the nail gun guide mechanism includes a pilot. The pilot, preferably integral with the guide mechanism, is situated on the guide mechanism in such a way that when the mechanism is mounted to the nail gun, the pilot is located immediately adjacent to the nail gun channel. The tip of the pilot extends slightly past the nose of the nail gun. When the user wishes to shoot a nail, the user inserts the pilot into the hole where the nail is to be driven; the pilot tip is sufficiently small as to readily permit the nail to pass easily into the hole while the pilot is located therein. The close proximity of the pilot to the nail gun channel ensures that the nail will be desirably located, i.e., in the hole, as it exits the nail gun. As noted earlier, the biased arm simultaneously ensures that the nail is properly oriented in the channel; the arm and pilot thus cooperate to ensure that each nail is desirably oriented and located as the nail is driven from the nail gun.

These and other objects, features, and advantages of the present invention will become more fully apparent from the following description and appended claims, or may be learned by the practice of the invention as set forth hereinafter.

BRIEF DESCRIPTION OF THE DRAWINGS

In order to more fully understand the manner in which the above-recited and other advantages and objects of the invention are obtained, a more particular description of the invention will be rendered by reference to specific embodiments theroef which are illustrated in the appended drawings. Understanding that these drawings depict only typical embodiments of the invention and are not therefore to be construed as limiting its scope, the invention in its presently understood best mode for making and using the same will be described and explained with additional specificity and detail through the use of the accompanying drawings in which.

DETAILED DESCRIPTION OF THE PREFERRED EMBODIMENTS

The present invention relates to an improved nail guide mechanism for nail guns. FIGS. 1 through 6 show a guide mechanism according to one preferred embodiment of the present invention. It is to be understood that the drawings are diagrammatic and schematic representations of presently preferred embodiments of the invention, and are not to be construed as limiting the present invention. Finally, it should be understood that the drawings are not necessarily drawn to scale.

Figure 1:
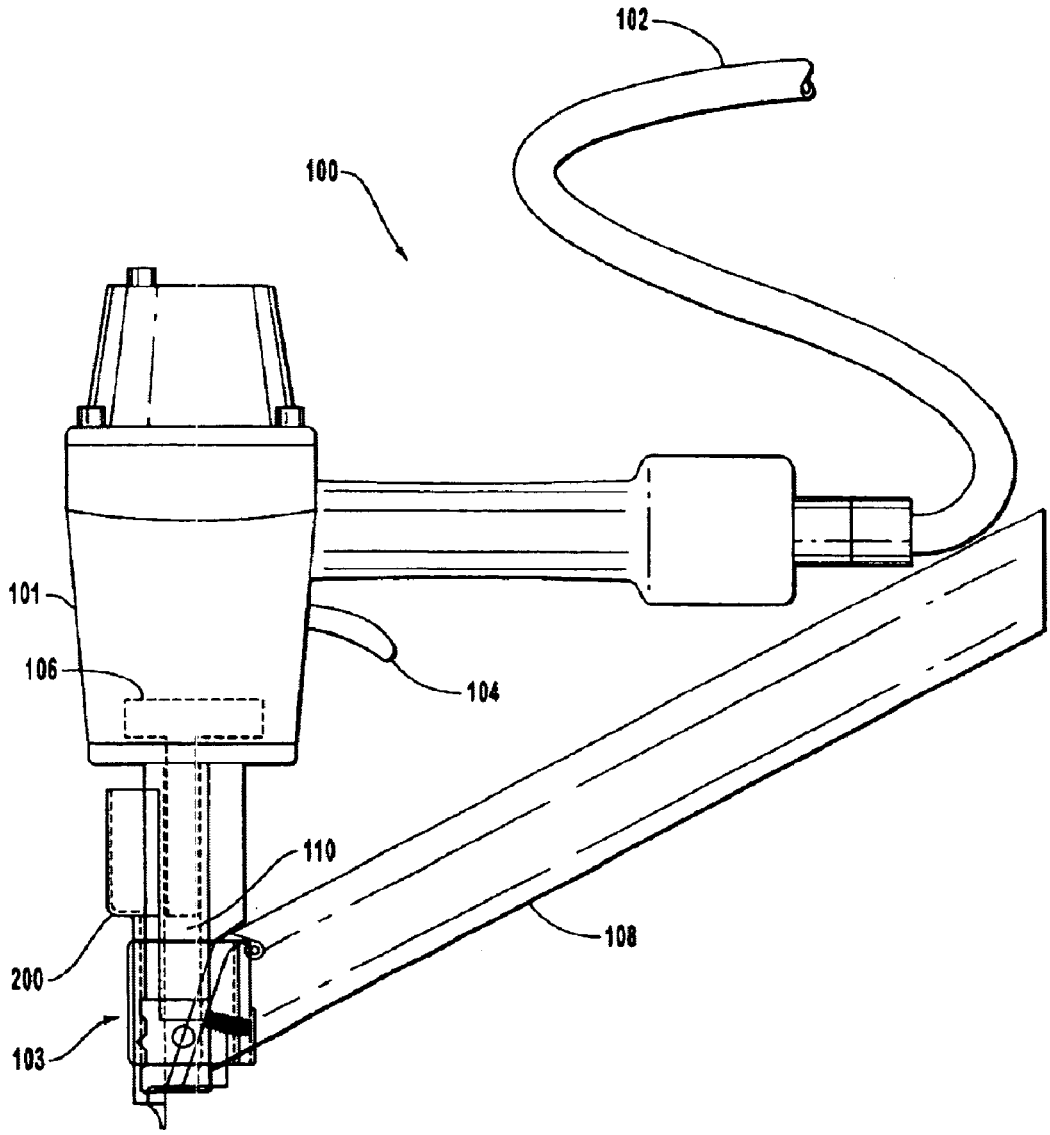
FIG. 1 is a side view of a typical nail gun showing the inventive nail guide mounted thereto.

With reference to FIG. 1, the nail gun or fastener driver is indicated generally as 100. Nail gun 100 is comprised generally of [generally of] body 101 including nose portion 103 and receptacle 108. Nail gun 100 is connected to a power source 102 such as compressed air, electrical power or the like; the power source is interlocked with gun trigger 104 and the drive mechanism 106. Often a safety mechanism is in communication with gun trigger 104 to prevent accidental activation. Generally, a user of nail gun 100 must depress the safety mechanism (not shown) in order to activate gun trigger 104. A plurality of nails or fasteners 114 is stored in receptacle 108. The operator selectively activates drive mechanism 106 by squeezing gun trigger 104; when gun trigger 104 is squeezed, power is applied to drive mechanism 106 that, in turn, drives a nail down channel 110, and through the nail gun guide mechanism, designated generally as 200.

As indicated in FIGS. 2 through 4c, fastener guide mechanism 200 includes an attachement portion or mounting bracket, indicated generally as 300, and a guide portion indicated generally as 400; in one preferred embodiment, the mounting bracket and guide portion are separate elements. In an alternative preferred embodiment, guide portion 400 is integral with attachement portion 300.

With continuing reference to FIGS. 2 and 4a through 4c, mounting bracket 300 has recess 302 formed therein to receive nose 112 of the nail gun 100. Mounting bracket 300 also comprises at least one hole 304 (FIG. 4B) that is capable of receiving fastener 306 (FIG. 4C); in one preferred embodiment, hole 304 is tapped to receive a threaded retaining screw. Fasteners 306 (FIG. 4C) permit guide mechanism 200 to be readily attached and/or removed in the field. A quick release device for ready attachment and/or detachment of the guide mechanism is also contemplated as being within the scope of the present invention.

Figure 3:
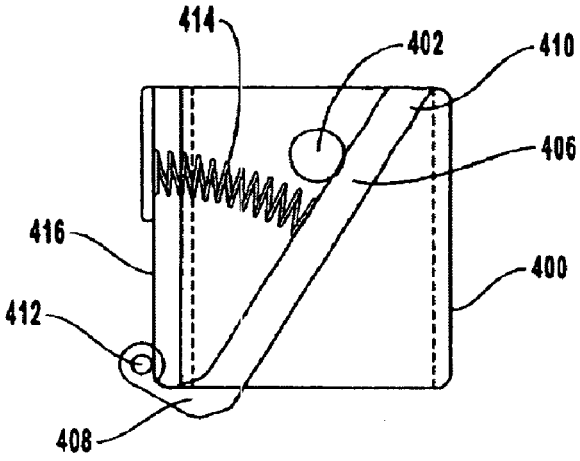
FIG. 3 is longitudinal cross section view of the guide portion showing the pre-compressed spring and biased arm arrangement.
Figure 4A:
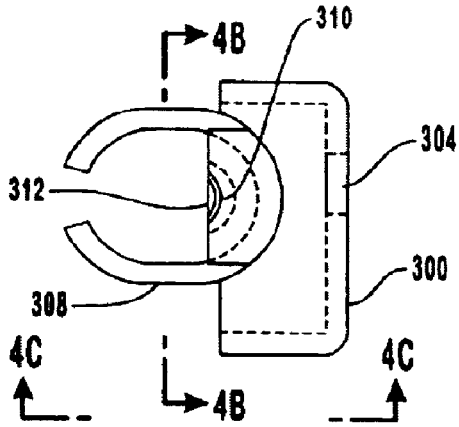
FIG. 4A is a view of the mounting bracket.
Figure 4B:
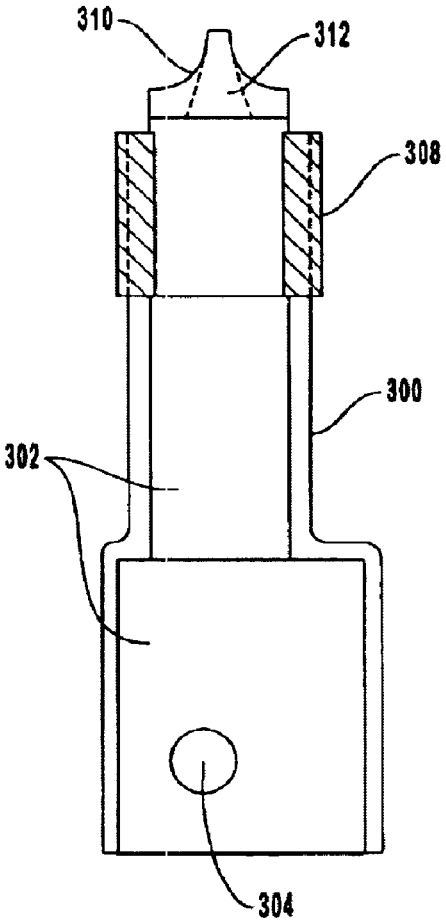
FIG. 4B is a longitudinal cross sectional view of the mounting bracket taken along line 4B in FIG. 4A.
Figure 5A:
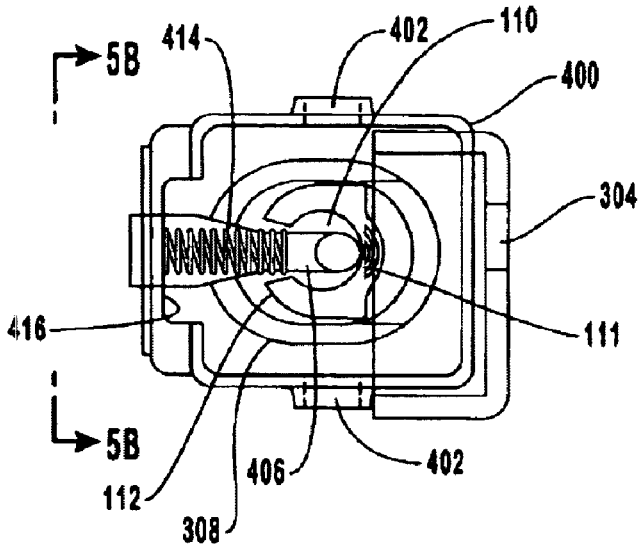
FIG. 5A is a view looking into the nose of the nail gun, and showing the nail guide mounted thereto.
Figure 5B:
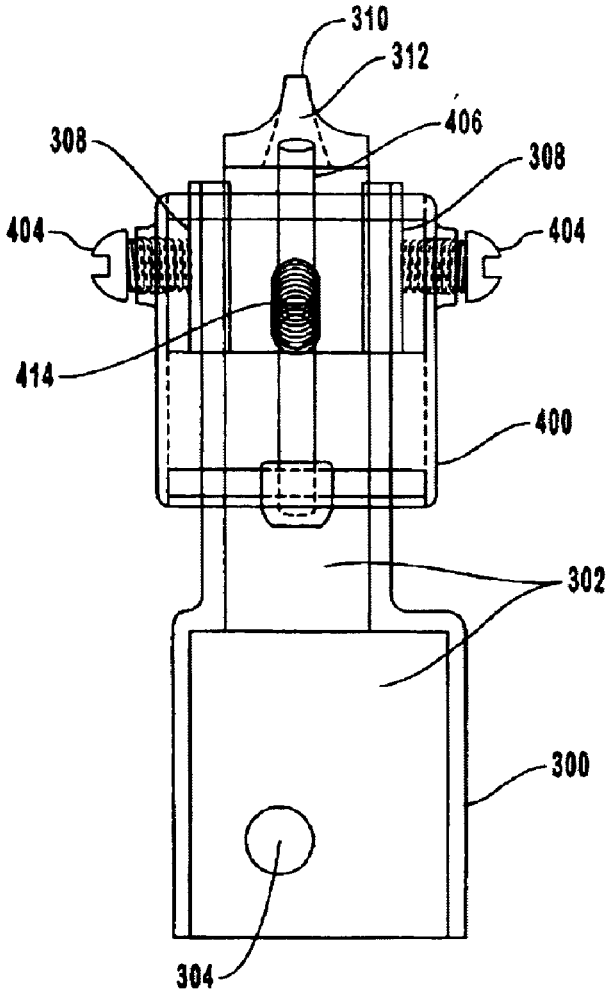
FIG. 5B is a front view of the nail guide, with the nose of the nail gun removed for clarity.

Reference is next made to FIGS. 4a, 4b, 5a and 5b, wherein mouting bracket 300 further comprises integral sleeve 308 (FIG. 5B) that substantially encloses nose 112 of nail gun 100 when guide mechanism 200 is mounted thereto; sleeve 308 serves to facilitate attachment of guide portion 400 to mounting bracket 300. Specifically, guide portion 400 has a plurality of holes 402 that receive fasteners 404 (FIG. 3B); in one preferred embodiment, holes 402 are tapped to receive threaded retaining screws. Fasteners 404 are threaded into the holes until the respective ends of fasteners 404 achieve contact with sleeve 308 of mounting bracket 300, as indicated in FIG. 5b. When contact is thus achieved, fasteners 404 are further tightened to the extent necessary to ensure that no relative motion can occur between guide portion 400 and mounting bracket 300.

Turning now to guide portion 400 of guide mechanism 200, and with reference to FIG. 3, guide portion 400 comprises transfer element of arm 406 having pivot end 408 and opposing control end 410. Pivot end 408 of arm 406 is fixed about a pin 412 so as to rotatably secure arm 406 thereto; the opposing control end 410 of the arm is not fixed. In one preferred embodiment of the present invention, arm 406 has a substantially circular cross-section (not shown). However, a variety of cross-sectional shapes are contemplated as being within the scope of the present invention as well; such shapes include, but are not limited to, oval, rectangular, and square.

With continuing reference to FIG. 3, a partially pre-compressed spring 414 is interposed between the rear wall 416 of guide portion 400 and the arm 406. The effect of the pre-compression is that a force is exerted on arm 406 by partially pre-compressed spring 414; imposition of the force causes arm 406 to rotate about pin 412 and continuously biases opposing control end 410 of arm 406 into channel 110, as indicated in FIG. 5a. It is well known to those skilled in the art that the force exerted by a given spring is directly proportional to the amount of deformation imposed upon the spring. Thus, the pre-compressed spring is capable of exerting a wide range of forces on arm 406; the magnitude of the force exerted depends on the extent to which partially pre-compressed spring 414 is deformed. The force thus exerted by partially pre-compressed spring 414 and transmitted by arm 406 will hereinafter be referred to as the "orienting force." Finally, as indicated in FIG. 5a, the aligned openings of sleeve 308 and nose 112 permit ready positioning and movement of partially pre-compressed spring 414 and the arm 406.

Note that while the preferred embodiment discloses nail guide mechanism 200 employing arm 406 biased by partially pre-compressed spring 414, nail guide mechanisms employing any kind of resiliently biased device to create a sufficient orienting force are contemplated as being within the scope of the invention disclosed herien. Such devices include, but are not limited to, a resilient metal cantilever having one end fixed to the guide mechanism and having the free end biased into the channel.

Figure 2:
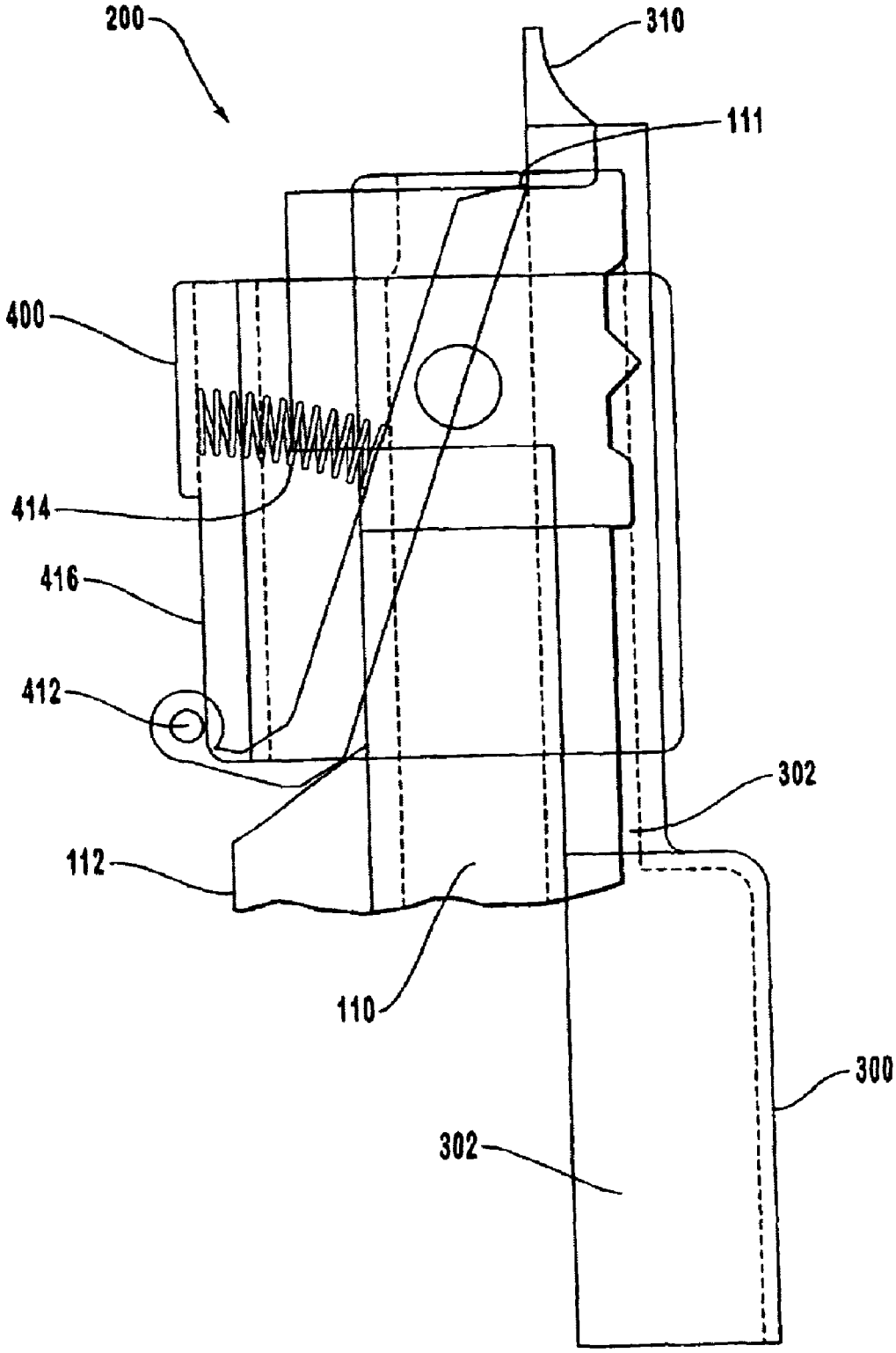
FIG. 2 is a cross sectional view of the nail guide mechanism showing the orientation of the mounting bracket and guide portion with respect to the nail gun.

When there is no nail present in guide portion 400, the force imposed by partially pre-compressed spring 414 biases opposing control end 410 of arm 406 into channel 110 so that arm 406 contacts the outer bottom edge 111 of channel 110, as indicated in FIG. 2.

As further indicated in FIG. 5a, when at rest arm 406 blocks a sufficient portion of channel 110 that a nail traveling down channel 110 must necessarily impact arm 406 prior to exiting nail gun 100.

Figure 6:
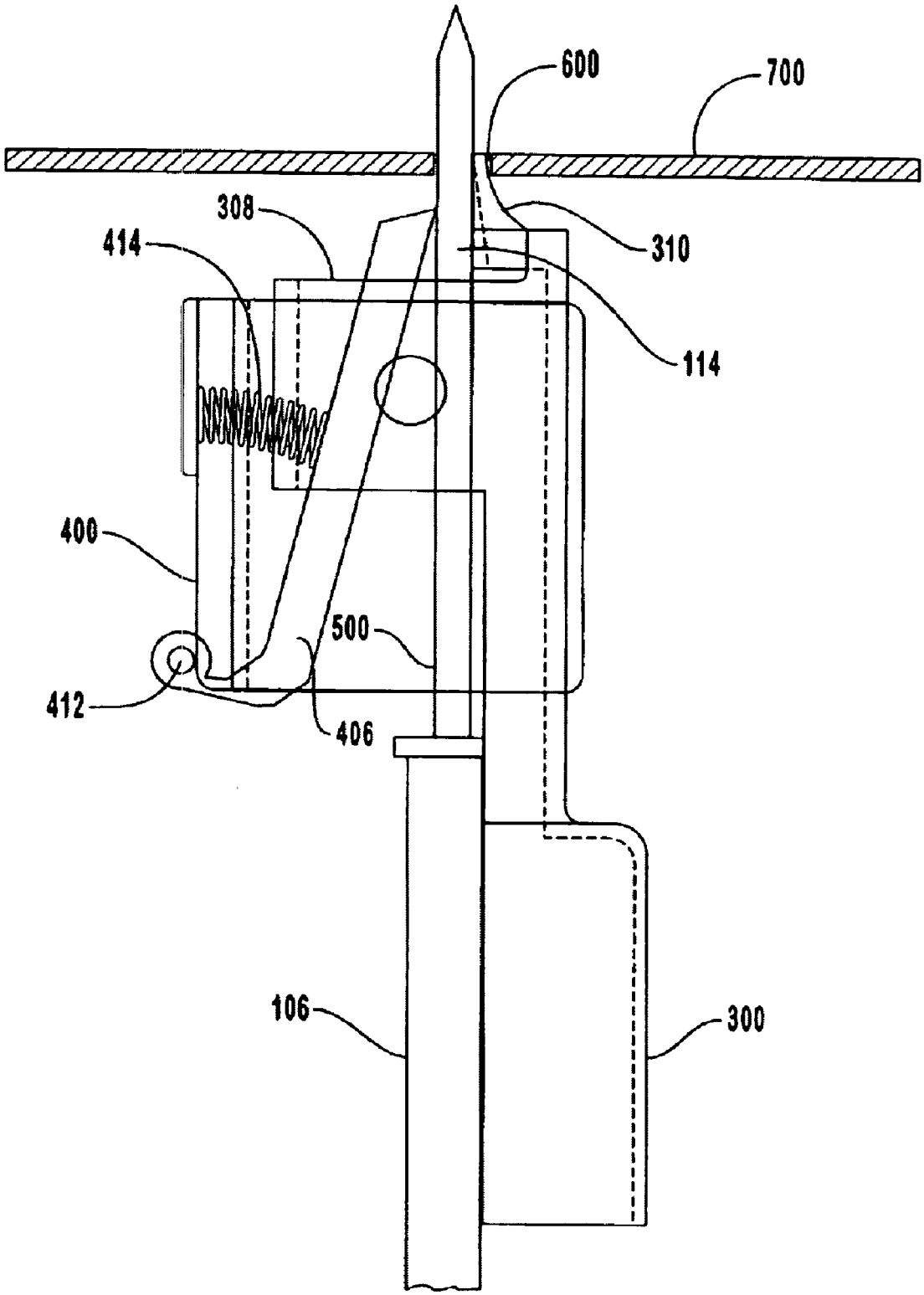
FIG. 6 is a cross sectional view of the nail guide showing the nail guide and pilot cooperating to ensure the nail orientation in a selected hole.

When a user squeezes gun trigger 104 of nail gun 100, the nail is driven down channel 110 by drive mechanism 106, and impacts opposing control end 410 of arm 406. However, the orienting force imposed on arm 406 by partially pre-compressed spring 414 is, desirably, substantially less than the force imposed upon arm 406 by the nail. Accordingly, the force exerted by the nail on arm 406 overcomes the opposing bias of arm 406 and displaces arm 406 sufficiently to permit the nail to be interposed between arm 406 and the outer bottom edge 111 of channel 110, as indicated in FIG. 6. The responsiveness of arm 406 also permits the head of the nail to readily displace arm 406 to the extent necessary to allow the nail head to pass by arm 406 as the nail exits gun 100.

In one alternative embodiment of the present invention partially pre-compressed spring 414 positions arm 406 such that opposing control end 410 of arm 406 is centered in outer bottom edge 111 of channel 110. In this manner, when a nail is forced by drive mechanism 106 down channel 110 the nail point of the nail is centered in the outer bottom edge 111 of channel 110 to obtain optimal positioning for driving the nail into the work piece.

In one alternative preferred emboidment, partially pre-compressed spring 414 is not pre-compressed. Rather, the undeformed length of an opposing mechanism similar in function to partially pre-compressed spring 414 is such that arm 406 naturally extends into channel 110 and no force is exerted by the opposing mechanism on arm 406 when channel 110 is empty. When a nail travels down channel 110, which process is described in detail above the force of the nail displaces arm 406 and at least partially compresses the opposing mechanism. The opposing mechanism reacts to the compression by exerting a force, i.e., the orienting force, on arm 406. The arm then transmits the orienting force to the nail or fastener.

Due to the resilient nature of partially pre-compressed spring 414 which it is connected, arm 406 is responsive to whatever orientation the nail has assumed, that is, after the nail comes into contact with arm 406, the orienting force transmitted by arm 406 has a natural tendency to orient the nail and/or retain the nail in a desired orientation. In one preferred embodiment, the orienting force acts substantially radially with respect to the nail. Further, in another preferred embodiment, the orienting force positions the nail so that the longitudinal axis of the nail is substantially parallel to the sides of channel 110; the nail is preferably positioned at or near the outer bottom edge 111 of channel 110, as indicated in FIG. 6 and may preferably be centered in the outer bottom edge 111 of channel 110. Note that the magnitude of the force required to orient a nail may vary from one nail to another; the magnitude will depend, at least in part, upon such variables as the speed and attitude of the nail as it enters guide mechanism 200. Accordingly, this invention contemplates a nail guide mechanism that may employ orienting forces of a variety of magnitudes. Still another embodiment of the present invention contemplates an orienting force that is constant in magnitude for nails driven at a consistent speed and attitude.

As noted earlier, partially pre-compressed sorting 414 continuously biases arm 406 into channel 110. As a result, arm 406 transmits the orienting force to the nail during the entire time that the nail is interposed between arm 406 and the outer bottom edge 111 of channel 110. Continuous application of the orienting force, by guide mechanism 200, thus ensures that every nail, regardless of its orientation upon entering guide mechanism 200, exits nail gun 100 in a consistent and predictable orientation. Although one preferred embodiment of the present invention reaches an arm continuously transmitting an orienting force to the nail as the nail passes the arm, this invention also contemplates resiliently biased arm arrangements wherein the arm briefly loses physical contact with the nail after the initial impact of the nail on the arm.

Figure 4C:
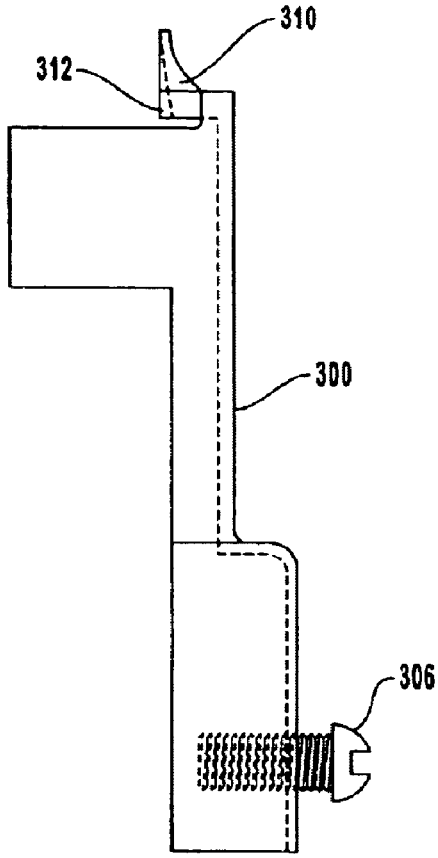
FIG. 4C is a view of the mounting bracket taken along lines 4C in FIG. 4A.

With reference now to FIGS. 4a through 4c, mounting barcket 300 of guide mechanism 200 further comprises pilot or locator elements 310 to facilitate consistent placement of the nails. In one preferred embodiment, pilot 310 comprises a short stud that is integral with mounting bracket 300 and extends slightly past the nose of nail gun 100. As indicated in FIG. 2, pilot 310 is situated outside and immediately adjacent to the outer bottom edge 111 of channel 110 when guide mechanism 200 is mounted to nail gun 100. Referring now to FIG. 6, pilot 310 is sufficiently small in size, relative to the diameter of hole 600 in work piece 700 through which the nail 500 is to be driven, such that when pilot 310 is placed into hole 600, there is adequate room remaining in hole 600 for ready placement of the nail 500. In one preferred embodiment of the present invention, pilot 310 includes a longitudinal groove 312 (FIG. 5B) that receives the nail 500 and aids in the guiding thereof.

As noted earlier, in one preferred embodiment, the orienting force acts to position each nail 500 outer bottom edge 111 of channel 110 and in one embodiment the nail 500 is centered in outer bottom edge 111 of channel 110; thus, the close proximity of pilot 310 to channel 110 (FIG. 6) provides assurance to the user that when pilot 310 is inserted into hole 600 through which the nail 500 is to be driven, the nail 500 will be driven into hole 600. Pilot 310 thus cooperates with arm 406 to ensure that each nail 500 will be driven into the selected hole at the desired orientation.

Figure 7A:
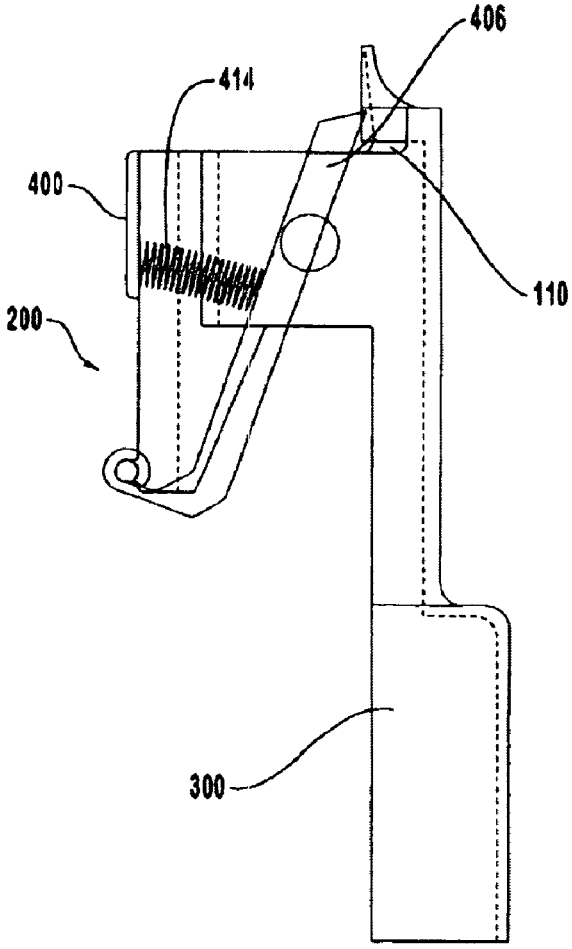
FIG. 7A is a cross sectional view of an alternative embodiment of the present invention with the mounting bracket integral with the guiding mechanism.
Figure 7B:
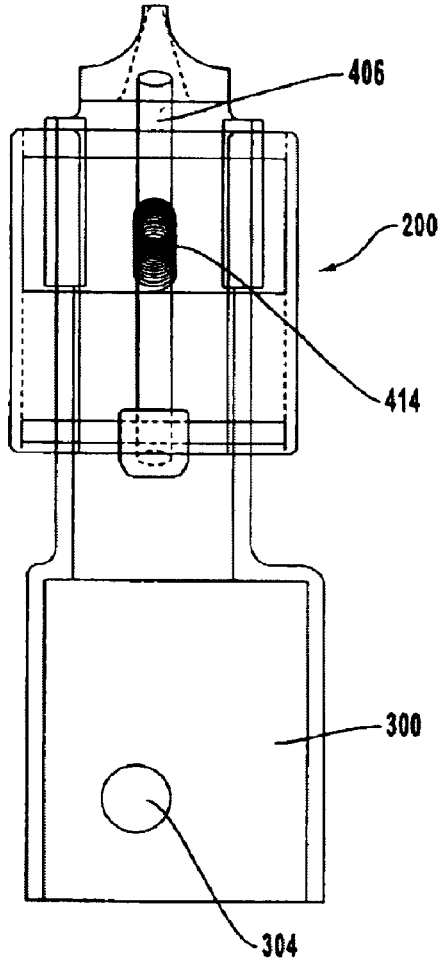
FIG. 7B is a view of the alternative embodiment depicted in FIG. 7A viewed from a different angle.

As mentioned above, in an alternative embodiment of the present invention, mounting bracket 300 and guide portion 400 are formed as an integral piece as shown in FIGS. 7A and 7B. The above discussion relating to the structure and function of arm 406 and partially pre-compressed spring 414 which form a portion of guide portion 400 as well as channel 110 are likewise applicable in the alternative embodiment. In the alternative embodiment shown in FIGS. 7A and 7B, the present invention provides for mounting bracket 300 to be integral with guide portion 400, thus avoiding the added expense and complexity of manufacturing for integral sleeve 308 and plurality of holes 402 for receiving fasteners 404. Such an alternative preferred embodiment avoids the complexity of threading holes 402 and threading fasteners 404 into holes 402 to achieve contact with sleeve 308 of mounting bracket 300 as depicted in FIG. 5B. In this manner, mounting bracket 300 is placed integral with guide portion 400 to form one integral guide mechanism 200 with at least one hole 304 capable of receiving a fastener 306 (not shown) to permit guide mechanism 200 to be readily attached and/or removed in the field.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In conjuntion with a framing nail gun having a nose portion defining a substantially U-shaped channel through which nails are propelled, the substantially U-shaped channel including an open side and a bottom, a fastener guide mechanisms for adapting the framing nail gun for use in mounting metal members, the fastener guide mechanism being removably attached about the nose portion and comprising:

(a) an attachment portion removably secured about the nose portion of the framing nail gun, said attachment portion including a substantially U-shaped sleeve which defines an opening that is substantially aligned with the open side of the substantially U-shaped channel when said attachment portion is secured about the nose portion;

(b) a guide portion joined to said attachement portion and including a pivot arm connected to a spring, said spring biasing said pivot arm so that [at least] a portion of said pivot arm extends through said opening in said substantially U-shaped sleeve of said attachment portion and through the open side of the substantially U-shaped channel of the nose portion so as to be received in the substantially U-shaped channel, and said pivot arm transmitting an orienting force to the nails passing through the substantially U-shaped channel.

2. The fastener guide mechanism recited in claim 1, wherin said spring is pre-compressed.

3. The fastener guide mechanism recited in claim 1, further including a pilot.

4. The fastener guide mechanism recited in claim 1, wherein said guide portion is removably joined to said attachment portion so as to facilitate repositioning of said guide portion relative to said attachment portion.

5. The fastener guide mechanism recited in claim 1, further comprising a stop for facilitating positioning of the fastener guide mechanism with respect to the nose of the nail gun.

6. The nail gun as recited in claim 1, wherien said guide portion is integral with said attachment portion.

7. A nail gun connectable to a power source and comprising:

(a) a body including a receptacle portion configured to hold at least one nail, and said body including a nose portion defining a channel through which nails are propelled, said channel having a bottom as well as an open side through which said nails enter from said receptacle portion;

(b) a drive mechanism at least indirectly attached to said body, said drive mechanism propelling said nails and said drive mechanism being at least indirectly impelled by the power source; and (c) a fastener guide mechanism removable secured to the nail gun, comprising:

(i) an attachment portion disposed about said nose portion of the nail gun, said attachment portion including a sleeve which defines an opening that is substantially aligned with said open side of said channel when said fastener guide-mechanism is attached to the nail gun; and (ii) a guide portion jointed to said attachment portion and including a transfer element connected to a resilient member, said resilient member biasing said transfer element so that [at least] a portion of said transfer element extends into said opening defined by said sleeve of said attachment portion and through said open side of said channel of said nose portion so as to be at least partially received in said channel.

8. The nail gun as recited in claim 7, wherein said resilient member is integral with said transfer element.

9. The nail gun as recited in claim 7, wherein said resilient member comprises a spring.

10. The nail gun as recited in claim 7, wherein said transfer element comprises a pivot arm.

11. The nail gun as recited in claim 7, further comprising a pilot attached to said fastener guide mechanism.

12. The nail gun as recited in claim 7, wherein the nail gun shoots a first type of nail when said fastener guide mechanism is not present on said nose portion, and wherein the nail gun is capable of shooting a second type of nail when said fastener guide mechanism is attched to said nose portion.

13. The nail gun as recited in claim 7, wherein said guide portion is removably joined to said attachment portion so as to facilitate repositioning of said guide portion relative to said attachment portion.

14. The nail gun as recited in claim 7, wherein said guide portion is integral with said attachment portion.

15. The nail gun recited in claim 7, further comprising a stop for facilitating positioning of said fastener guide mechanism with respect to said nose portion of the nail gun.

16. For use in conjunction with a nail gun configured to drive a first type of nail, the nail gun having a nose portion defining a channel through which nails are propelled, and the channel including an open side and a bottom, a fastener guide mechanism for adapting the nail gun to drive a second type of nail when the fastener guide mechanism is attached to the nose portion, the fastener guide mechanism comprising:

(a) an attachment portion configured to be removably secured to the nail gun, said atachement portion including a sleeve which defines an opening that is substantially aligned with the open side of the channel when said attachment portion is attached to the nail gun; and (b) a guide portion joined to said attachment portion and including a transfer element connected to a resilient member, said resilient member biasing said transfer element so that [at least] portion of said transfer element extends into said opening defined by said sleeve of said attachment portion and through the open side of the channel of the nose portion so as to be at least partially received in the channel.

17. The fastener guide mechanism as recite in claim 16, wherein said guide portion is removably joined to said attachment portion so as to facilitate repositioning of said guide portion relative to said attachment portion.

18. The fastener guide mechanism as recited in claim 16, wherein said guide portion is integral with said attachment portion.

19. The fastener guide mechanism as recited in claim 16, wherein said resilient member is integral with said transfer element.

20. The fastener guide mechanism as recited in claim 16, wherein said resilient member comprises a spring.

21. The fastener guide mechanism as recited in claim 16, wherein said transfer element comprises a pivot arm.

22. The fastener guide mechanism as recited in claim 16, further comprising a pilot.

23. The fastener guide mechanism recited in claim 16, further comprising a stop for facilitating positioning of the fastener guide mechanism with respect to the nose of the nail gun.

24. The fastener guide mechanism recited in claim 16, wherein said sleeve is substantially U-shaped.

* * * * *